US011166243B2

(12) United States Patent
Chakraborty

(10) Patent No.: US 11,166,243 B2
(45) Date of Patent: Nov. 2, 2021

(54) MOBILE TERMINAL DEVICES AND METHODS FOR APPORTIONING UPLINK TRANSMISSION POWER IN MOBILE COMMUNICATION DEVICES

(71) Applicant: Apple Inc., Cupertino, CA (US)

(72) Inventor: Soumen Chakraborty, Bangalore (IN)

(73) Assignee: Apple Inc., Cupertino, CA (US)

( * ) Notice: Subject to any disclaimer, the term of this patent is extended or adjusted under 35 U.S.C. 154(b) by 16 days.

(21) Appl. No.: 16/323,261

(22) PCT Filed: Sep. 29, 2016

(86) PCT No.: PCT/US2016/054263
§ 371 (c)(1),
(2) Date: Feb. 5, 2019

(87) PCT Pub. No.: WO2018/063200
PCT Pub. Date: Apr. 5, 2018

(65) Prior Publication Data
US 2019/0215783 A1 Jul. 11, 2019

(51) Int. Cl.
*H04W 52/34* (2009.01)
*H04W 52/14* (2009.01)
(Continued)

(52) U.S. Cl.
CPC ......... *H04W 52/34* (2013.01); *H04W 52/146* (2013.01); *H04W 52/367* (2013.01);
(Continued)

(58) Field of Classification Search
CPC ..... H04W 16/14; H04W 84/12; H04W 88/06; H04W 52/146; H04W 52/34;
(Continued)

(56) References Cited

U.S. PATENT DOCUMENTS

2011/0105136 A1* 5/2011 Choi ................... H04W 48/08
455/452.1
2013/0065525 A1 3/2013 Kiukkonen et al.
(Continued)

OTHER PUBLICATIONS

International Search Report based on application No. PCT/US2016/054263 dated Jul. 13, 2017 (13 pages) (Reference Purpose Only).

*Primary Examiner* — Golam Sorowar
(74) *Attorney, Agent, or Firm* — Kowert, Hood, Munyon, Rankin & Goetzel. P.C.

(57) ABSTRACT

A method for apportioning uplink transmission power in a mobile communication device is disclosed including determining a maximum power limit for the mobile communication device, identifying a first wireless transmission scheduled to transmit at a first power and a first time according to a first radio access technology (RAT1); identifying a second wireless transmission scheduled to transmit at a second power and a second time according to a second radio access technology (RAT2). An aggregate transmission power required for transmission is calculated and transmission is apportioned asymmetrically as to at least one of power and/or time between the first wireless transmission and the second wireless transmission where the required aggregate transmission power exceeds said maximum power limit. Transmitting at least one of said first and/or second wireless transmission according to said asymmetrical apportionment results in transmission within specified power limits.

20 Claims, 9 Drawing Sheets

(51) Int. Cl.
*H04W 52/38* (2009.01)
*H04W 52/36* (2009.01)
*H04W 88/06* (2009.01)
*H04W 72/12* (2009.01)

(52) U.S. Cl.
CPC ........ *H04W 52/38* (2013.01); *H04W 72/1215* (2013.01); *H04W 88/06* (2013.01)

(58) Field of Classification Search
CPC ............. H04W 52/346; H04W 52/367; H04W 72/1215; H04W 84/042; H04W 24/02; H04W 28/08; H04W 52/143; H04W 52/225; H04W 52/365; H04W 56/0005; H04W 56/0045; H04W 72/044; H04W 72/0446; H04W 72/1263; H04W 74/04
See application file for complete search history.

(56) References Cited

U.S. PATENT DOCUMENTS

| | | |
|---|---|---|
| 2013/0329639 A1 | 12/2013 | Wietfeldt et al. |
| 2014/0135027 A1* | 5/2014 | Kodali .............. H04W 72/1278 455/452.1 |
| 2015/0230190 A1 | 8/2015 | Shin et al. |
| 2015/0341869 A1* | 11/2015 | Sen ...................... H04W 52/367 455/522 |
| 2016/0029222 A1 | 1/2016 | Su et al. |
| 2016/0119883 A1* | 4/2016 | Lee ..................... H04W 52/146 370/329 |
| 2016/0198418 A1* | 7/2016 | Ishikura .............. H04W 52/143 455/522 |
| 2017/0026942 A1* | 1/2017 | Vajapeyam ........... H04W 72/04 |
| 2017/0142592 A1* | 5/2017 | Fischer ................. H04W 16/14 |
| 2017/0339717 A1* | 11/2017 | Futaki ................... H04W 16/14 |

* cited by examiner

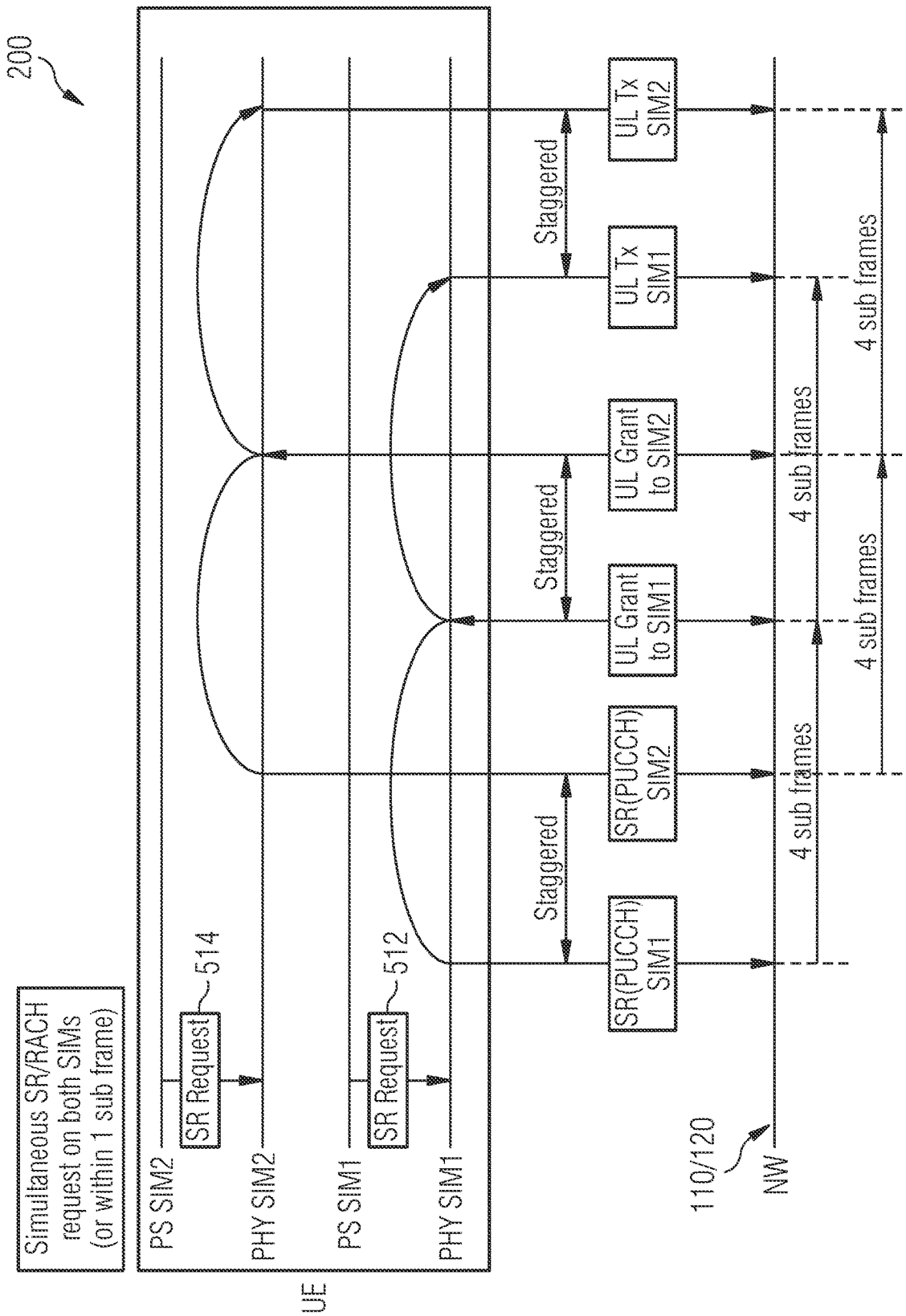

| Transmission type | Priority | Assigned by | Comment |
|---|---|---|---|
| PUCCH | High | L1 | L1 control channel |
| RACH | High | L1 | Random Access for Band width request or time alignment |
| SRS | High | L1 | Sounding channel |
| RRC Message (PUSCH) | Medium | L3 | L3 Control |
| RLC ACK/NACK (PUSCH) | Medium | L2 | L2 Ack/Nacks |
| Voice traffic (PUSCH) | Medium | L2 | Voide (includes VoIP) |
| Data traffic (PUSCH) | Low | L2 | Data |

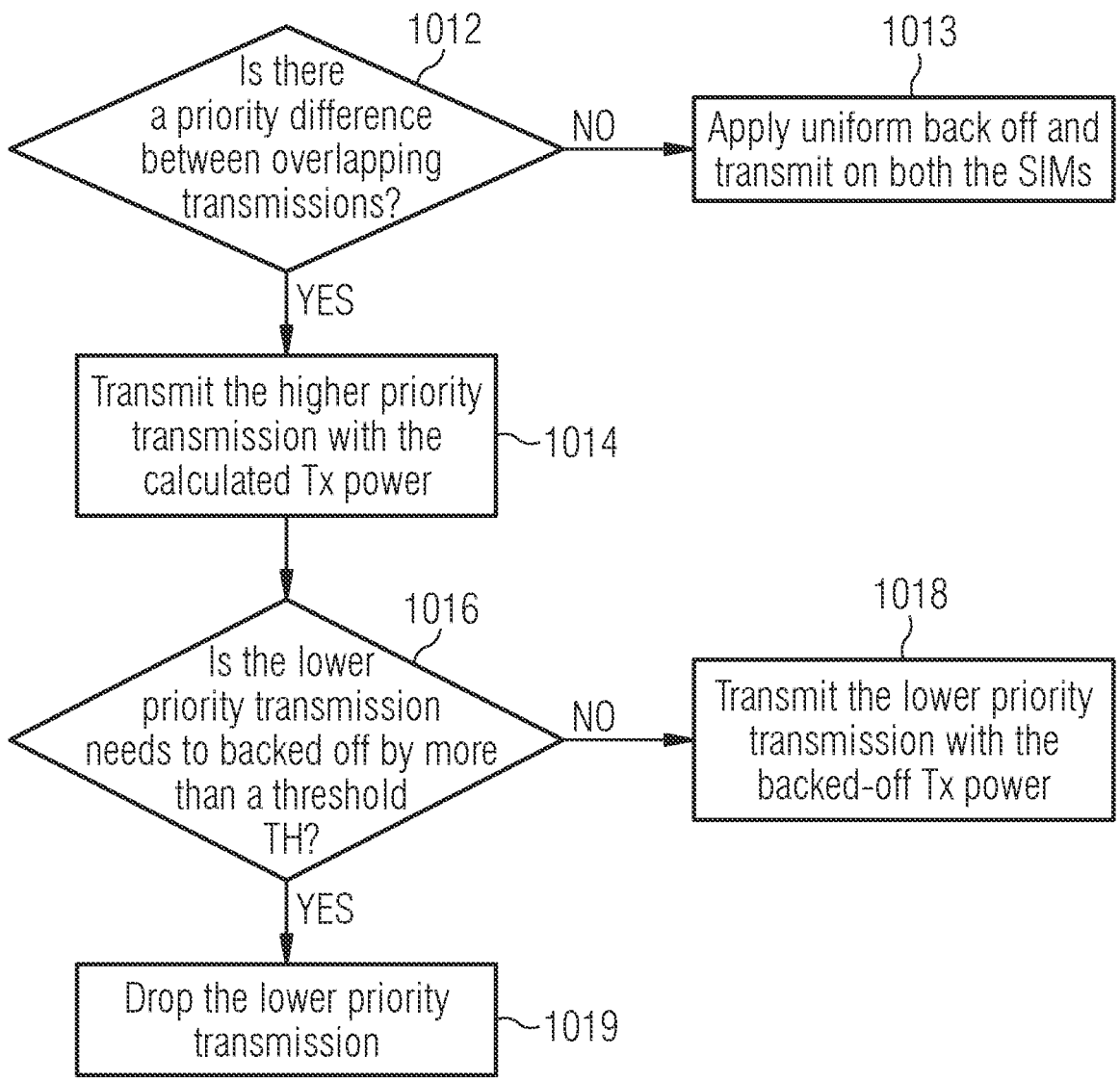

MOBILE TERMINAL DEVICES AND METHODS FOR APPORTIONING UPLINK TRANSMISSION POWER IN MOBILE COMMUNICATION DEVICES

CROSS-REFERENCE TO RELATED APPLICATIONS

This is a national phase application that claims priority to PCT Application PCT/US2016/054263, filed on Sep. 29, 2016, the entire contents of which are hereby incorporated by reference.

TECHNICAL FIELD

Various embodiments relate generally to mobile terminal devices and methods in mobile communication devices.

BACKGROUND

Mobile phone designs that incorporate multiple Subscriber Identity Modules (SIMs) have recently increased in popularity. There exist numerous variations of such multi-SIM designs, which each may allow for different degrees of operation for each included SIM. For example, straightforward designs such as Dual-Sim Dual-Standby (DSDS) designs may allow for one SIM to transmit and/or receive while the other SIM remains in standby mode. More complex designs including Dual-Receive Dual-SIM Dual-Standby (DR-DSDS) designs may allow for two SIMs to concurrently receive but only transmit on a time-sharing basis while Dual-Sim Dual-Active (DSDA) designs may allow two SIMs to simultaneously transmit and receive in parallel.

There may exist certain performance limitations in multi-SIM designs, particularly of the DSDA type, where simultaneous transmission may exceed maximum power transmission limits for a single device. In a multi-SIM scenario, the two SIMs in the mobile phone (also referred to as user equipment, or (UE)) can be connected to the same or different base stations. Because scheduling operations on the two SIMs are not typically coordinated, the UE may have not be able to transmit both signals at a desired power due to maximum power transmission limits that apply to each UE. Where power is backed off, the chance that one or the other transmission will not be received and/or decoded at the base station may increase.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various embodiments of the disclosure are described with reference to the following drawings, in which:

FIG. 5 shows a transmission staggering according to an aspect of the disclosure;

FIG. 10 is a flowchart illustrating decision criteria for power back-off according to an aspect of the disclosure.

DESCRIPTION

Figure 1:
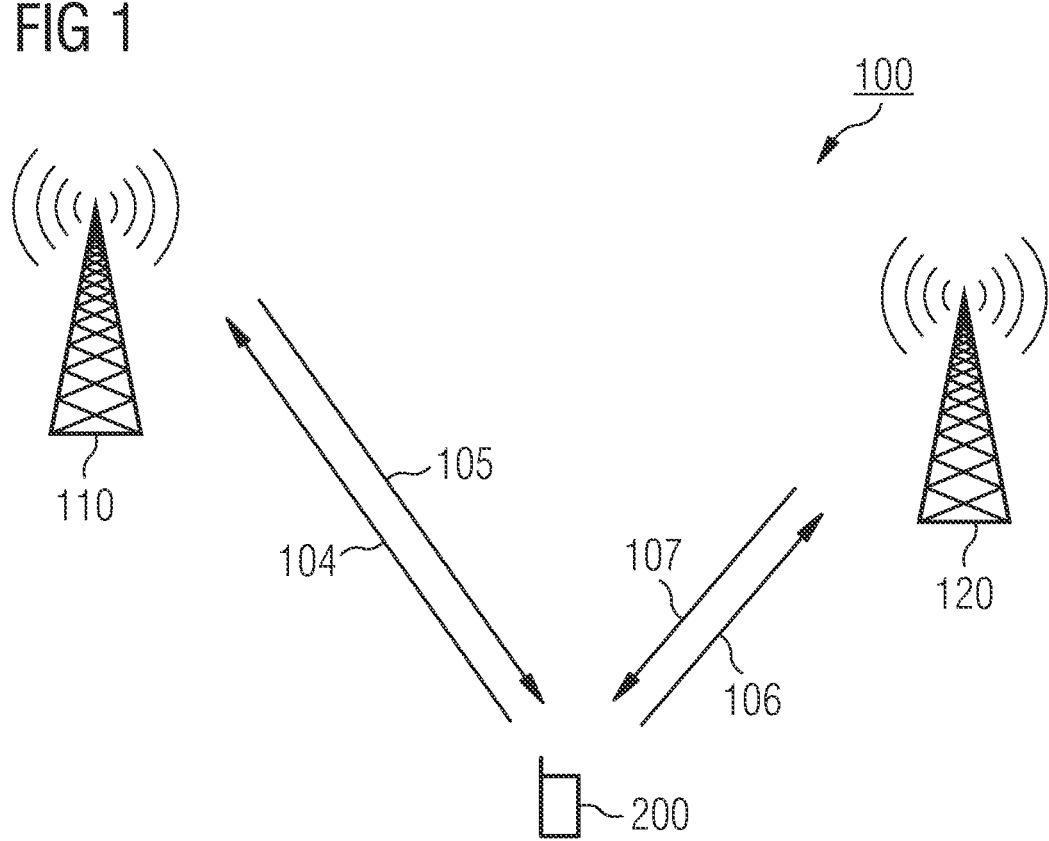
FIG. 1 shows a mobile communication device in communication with multiple eNodeBs.

The following detailed description refers to the accompanying drawings that show, by way of illustration, specific details and embodiments in which aspects of the disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity, for example, of objects is intended to expressly refer to more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry" or "processor") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

The term "multi-SIM" and its subset "dual-SIM" are used interchangeably herein to refer to mobile devices having at least two subscriber identity modules (SIMs). Whereas dual-SIM phones are discussed by way of example, the term "dual-SIM" is not intended to exclude hypothetical devices comprising three or more SIMs. Moreover, the term SIM is meant to encompass both a SIM embodied as a physical structure, or a circuit module including a chip that is selectively removable from a phone, as well as mobile phones capable of communicating in accordance with multiple subscriber identities simultaneously, whether or not a discrete module(s) is incorporated in the mobile device.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced (LTE-A), CDMA, WCDMA, LTE-A, General Packet Radio Service (GPRS), Enhanced Data Rates for GSM Evolution (EDGE), High Speed Packet Access (HSPA), HSPA Plus (HSPA+), and other similar radio communication technologies.

The term "RAT system" as utilized herein refers to the hardware, software, and/or firmware components of a mobile device that support operation of at least one Radio Access Technology (RAT). A RAT system may thus include one or more microprocessors/microcontrollers and/or one or more processing circuits, where the one or more microprocessors/microcontrollers may be configured to execute program code for software and/or firmware modules to control the microprocessor/microcontrollers to operate in accordance with the protocol stack (Layer 2 and 3) and/or physical layers (Layer 1) of a particular radio access technology. The microprocessors/microcontrollers may be configured to control the one or more processing circuits and any additional components in accordance with control logic provided by the software/firmware modules defined in the program code. It is appreciated that the RAT systems for multiple RATs may be integrated, such as in the case of a multi-mode baseband modem configured to support operation of more than one RAT. Accordingly, one or more microprocessors/microcontrollers, processing circuits, and/or software/firmware modules may be shared between multiple RAT systems. Such may include unified protocol stacks (Layers 2 and 3) and/or unified physical layers (Layer 1). A multi-mode RAT system may thus refer to one or more microprocessors/microcontrollers and one or more processing circuits that cooperatively support multiple RATs, such as in accordance with master and slave RAT roles; however it is appreciated that the term "RAT system" encompasses both single- and multi-mode RAT systems. A RAT system configured for a specific radio access technology may be denoted as e.g. an LTE system, a UMTS system, a GSM system, a Bluetooth system, a WiFi system, etc. A baseband modem may be referred to as a RAT system; however it is appreciated that a multi-mode baseband modem may be composed of multiple RAT systems, e.g. at least one RAT system for each radio access technology supported by the baseband modem, where each RAT system in a multi-mode baseband modem may be discrete or integrated relative to the other RAT systems.

The term "network" as utilized herein, e.g. in reference to a communication network such as a mobile communication network, is intended to encompass both an access component of a network (e.g. a radio access network (RAN) component) and a core component of a network (e.g. a core network component).

Unless explicitly specified, the term "transmit" encompasses both direct and indirect transmission. Similarly, the term "receive" encompasses both direct and indirect reception unless explicitly specified.

Multi-SIM designs may need to address timing conflicts caused by the operation of multiple SIMs. For example, both Dual-SIM Dual-Standby (DSDS) and Dual-Receive Dual-Sim Dual-Standby (DR-DSDS) designs may need to share reception and/or transmission resources between two SIMs, such as on a time-sharing basis in which only one SIM can receive and/or transmit at a given point in time. Similarly, multi-SIM designs that allow for one SIM to transmit simultaneously to the other SIM receiving (which may include DSDA, DR-DSDS, and DSDS depending on the specifics of each design) may need to limit transmission resources to avoid receiver desensitization, such as by scheduling lapses in transmission (i.e. "gaps") to reduce reception interference.

FIG. 1 illustrates a multi-SIM arrangement 100, including a mobile device 200 in communication with both a first base station 110, and a second base station 120. First transmission 104 from mobile device 200 is received by base station 110, whereas second transmission 106 is received by base station 120. Transmissions 104, 106 may be any of a random access channel request (RACH), scheduling request (SR), may be pursuant to a semi persistent scheduling (SPS) grant, or any other transmission from mobile device 200 to a base station, including signals intended for, but not necessarily received by the intended base station. According to at least one aspect of the disclosure, first transmission 104 is associated with a first SIM (SIM 1, illustrated in FIG. 2), and second transmission 106 is associated with a second SIM (SIM 2, FIG. 2). According to at least a further aspect of the disclosure, first transmission 104 takes place over a greater distance to base station 110 than second transmission 106 relative to base station 120.

Multi-SIM designs may minimize timing conflicts between each SIM by scheduling transmission and/or reception operations for each SIM in order to minimize missed or corrupted transmission and reception occasions. However, even careful scheduling may still result in certain missed or corrupted transmission and/or reception occasions for all SIMs. For example, as previously indicated a DSDS design may share a single set of receiver and transmitter resources between two independent SIMs. Accordingly, only one of the SIMs may receive and/or transmit at a time. It may therefore be unlikely for each SIM to be able to complete each scheduled transmission and reception occasion while participating in a transmission/reception time-sharing scheme with the other SIM, in particular when one or both SIMs are in a radio-active state.

Similar conflicts may occur between other radio access technologies, such as e.g. between a Cellular Wide Area radio access technology and a Short Range radio access technology (e.g. LTE and WiFi, LTE and Bluetooth, etc.), between two Short Range radio access technologies, etc. For example, a mobile terminal may be configured to support both an LTE radio connection and a WiFi radio connection, where certain LTE bands may interfere with WiFi bands. Alternatively, a mobile terminal may share transceiver resources between multiple such radio access technologies, and may accordingly not be able to concurrently perform radio activity for each radio access technology. Accordingly, there may exist reception and transmission conflicts in numerous mobile device designs.

In a multi-SIM scenario such as described herein, the two (or more) SIMs in the mobile device (or UE) can be connected to the same or different base stations. The scheduling operations on the two SIMs are typically not coordinated, with the result that multiple transmissions may occur simultaneously. This may lead to a situation, particularly in multi-SIM devices that are configured to permit simultaneous transmission from more than one SIM, that a "power excursion" may occur, particularly in power limited devices.

By way of example, mobile devices may be assigned a power limit, such as by government regulations. For example, regulatory bodies may limit the total output of each device sold as a mobile communications device. Such limits may be based on measured limits such as a specific absorption rate (SAR), which is a measure of the absorption of electromagnetic radiation by the human body. Because SAR is linked to the power output of a mobile device, an absolute limit on the total transmission power output of a device may keep the device within the specified SAR. Other factors may operate to limit the total power output of a mobile device. For example, specific circuit components may be characterized by a maximum power, for example an RF transmitter or amplifier may have inherent physical limits independent from, or in addition to, relevant government or regulatory limits, that act to prevent the output of power beyond a certain maximum level.

In particular, this situation presents problems in multi-SIM embodiments that may not be evident in single-SIM devices. Where both SIMs attempt to transmit at their designated (or scheduled) power (often set by the base station) at the same, or at an overlapping designated (or scheduled) time (again, often set by the base station) there is an additive effect in the total transmission power, also referred to herein as an 'aggregate transmission power'. In other words, where all or part of two transmissions overlap in time, the total, or aggregate, power of the combined transmission is greater than either of the transmissions alone.

This aggregate is the result of what is referred to herein variously as a 'collision', 'power collision', 'time-power collision' with the result that where the aggregate transmission power that would result if both transmissions were performed as scheduled exceeds a predetermined maximum transmission power (or SAR), a 'power excursion' would take place. Such excessive power outputs are considered undesirable.

To prevent a power excursion, it is possible to 'back off' the power of the UE on both transmissions until the aggregate transmission power is below the transmit power limit designated for, or the transmit power limit that is a design feature of, the UE. This approach increases the chances that one or both transmissions will not be properly decoded at the respective eNodeB.

Figure 2:
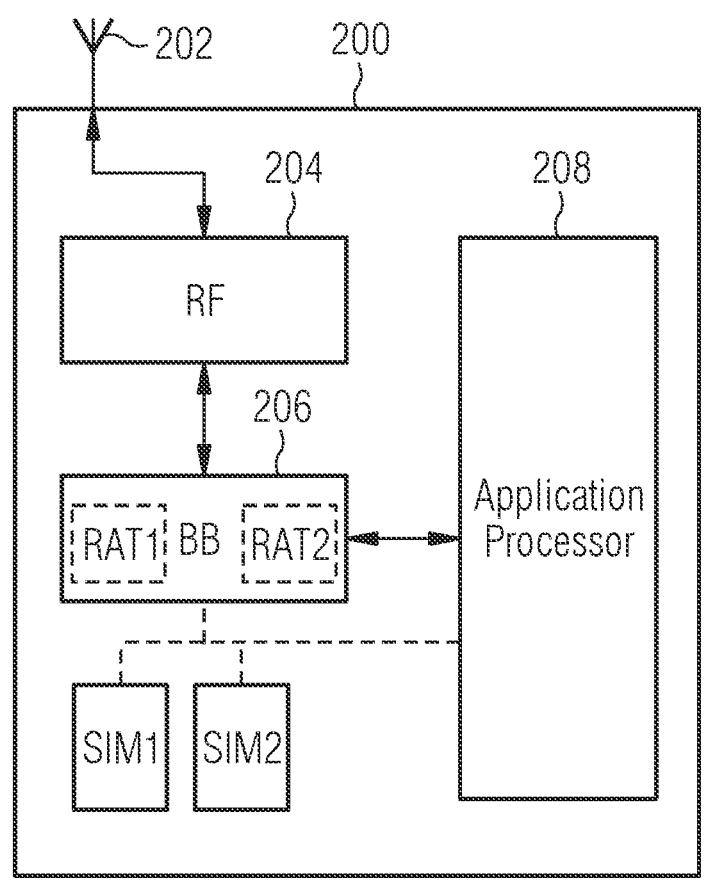
FIG. 2 shows an internal configuration of a mobile terminal device.

FIG. 2 shows a block diagram illustrating an internal configuration of mobile device or terminal 200 according to an aspect of the disclosure. As will be detailed, mobile terminal 200 may be a device capable of supporting multiple radio connections, such as a multi-SIM device or another mobile device that supports multiple radio access technologies.

As illustrated in FIG. 2, mobile terminal 200 may include antenna 202, radio frequency (RF) transceiver/RF circuit 204, baseband system 206, application processor 208, SIM1, and SIM2. As shown in in FIG. 2, the aforementioned components of mobile terminal 200 may be implemented as separate components. However, it is appreciated that the architecture of mobile terminal 200 depicted in FIG. 2 is for purposes of explanation, and accordingly one or more of the aforementioned components (or additional components not explicitly shown in FIG. 2) of mobile terminal 200 may be integrated into a single equivalent component or divided into two separate components with collective equivalence. It is understood that mobile terminal 200 may have one or more additional components, such as additional hardware, software, or firmware elements. For example, mobile terminal 200 may further include various additional components including processors/microprocessors, controllers/microcontrollers, memory, other specialty or generic hardware/processors/circuits, etc., in order to support a variety of additional operations. Mobile terminal 200 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

It is appreciated that the aforementioned components of mobile terminal 200, in particular, RF transceiver 204, baseband system 206, and application processor 208 may be implemented in a number of different manners, such as by hardware, firmware, software executed on hardware (e.g. a processor), or any combination thereof. Various options include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

In an abridged overview of the operation of mobile terminal 200, mobile terminal 200 may be configured to receive and/or transmit wireless signals according to multiple different wireless access protocols or radio access technologies (RATs), including any one of, or any combination of, LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The specific RAT capabilities of mobile terminal 200 may be dependent on the RAT capabilities of SIM1 (e.g. as a first radio connection of mobile terminal 200), SIM2 (e.g. as a second radio connection of mobile terminal 200), and baseband system 206.

Further to the abridged overview of operation of mobile terminal 200, RF transceiver 204 may receive radio frequency wireless signals via antenna 202, which may be implemented as e.g. a single antenna or an antenna array composed of multiple antennas. RF transceiver 204 may include various reception circuitry elements, which may include e.g. analog circuitry, configured to process externally received signals, such as mixing circuity to convert externally received RF signals to baseband and/or intermediate frequencies. RF transceiver 204 may also include amplification circuitry to amplify externally received signals, such as power amplifiers (PAs) and/or Low Noise Amplifiers (LNAs), although it is appreciated that such components may also be implemented separately. RF transceiver 204 may additionally include various transmission circuitry elements configured to transmit internally received signals, such as e.g. baseband and/or intermediate frequency signals provided by baseband system 206, which may include mixing circuitry to modulate internally received signals onto one or more radio frequency carrier waves and/or amplification circuitry to amplify internally received signals before transmission. RF transceiver 204 may provide such signals to antenna 202 for wireless transmission. RF transceiver 204 may be structurally configured according to various different transceiver architectures dependent on the intended capabilities of mobile terminal 200. For example, RF transceiver 204 may include a single receiver subsystem and single transmitter subsystem, e.g. for a DSDS multi-SIM design. Alternatively, RF transceiver 204 may include two receiver subsystems and a single transmitter subsystem, e.g. for a DR-DSDS multi-SIM design. Alternatively, RF transceiver 204 may include two receiver subsystems and two transmitter subsystems, e.g. for a DSDA multi-SIM design.

Further references herein to reception and/or transmission of wireless signals by mobile terminal 200 may thus be understood as an interaction between antenna 202, RF transceiver 204, and baseband system 206 as detailed above. Although not explicitly depicted in FIG. 2, RF transceiver 204 may be additionally connected to application processor 208.

Figure 3:
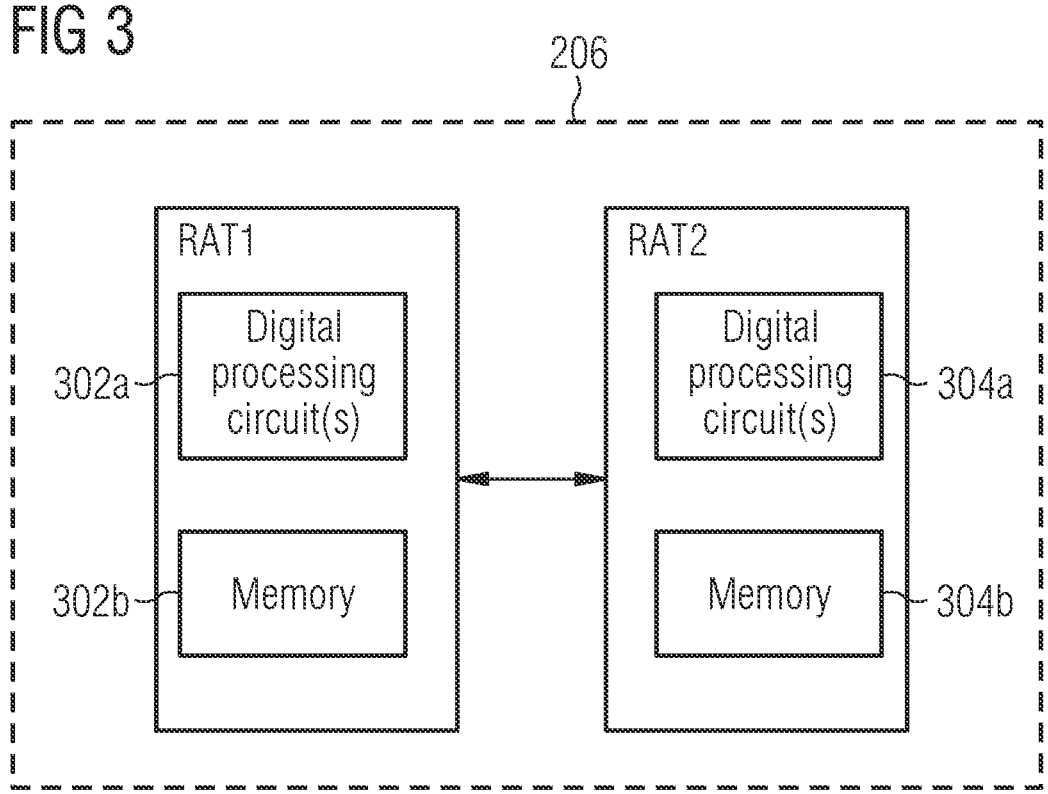
FIG. 3 shows an internal configuration of a baseband system of a mobile terminal device.

FIG. 3 shows a block diagram illustrating an internal configuration of baseband system 206 according to an aspect of the disclosure. Baseband system 206 may include RAT system RAT1 and RAT system RAT2, which may each be configured to support at least one radio connection each, where each radio connection may be for the same or different radio access technologies. In a multi-SIM context, RAT1 and RAT2 may be respectively allocated to SIM1 and SIM2 in accordance with a multi-SIM design. RAT1 may include digital processing circuit(s) 302a (one or more digital processing circuits) and memory 302b while RAT2 may include digital processing circuit(s) 304a and memory 304b. Digital processing circuit(s) 302a and 304a may each include at least one microprocessor/microcontroller configured to execute program code for software and/or firmware modules to control the at least one processor/controller to operate in accordance with protocol stack (Layer 2 and 3) and physical (Layer 1) layers of one or more radio access technologies. Each respective microprocessor/microcontroller of digital processing circuit(s) 302a and 304a may retrieve the corresponding code from memory 302b and 304b, respectively, and subsequently execute the program code. The respective microprocessors/microcontrollers of digital processing circuit(s) 302a and 304a may additionally control one or more additional processing circuits of digital processing circuit(s) 302a and 304a in accordance with control logic provided by the software/firmware modules defined in the program code. Further references to actions by RAT systems RAT1 and RAT2 may thus refer to operation of digital processing circuit(s) 302a and 304a in response to execution of program code stored in memory 304a and 304b, respectively.

Furthermore, RAT systems RAT1 and RAT2 of baseband system 206 may accordingly directly and/or indirectly control operations of RF transceiver 204, such as to perform specific transmission and/or reception activities as detailed above. RAT systems RAT1 and RAT2 of baseband system 206 may additionally control various other audio/video components (e.g. audio transducers including microphone(s) and/or speaker(s)) of mobile terminal 200.

The supported radio access technologies of RAT1 and RAT2 may depend on the RAT capabilities of SIM1 and SIM2. RAT systems RAT1 and RAT2 may each be multimode RAT systems, and accordingly may each be configured to operate in accordance with more than one radio access technology, e.g. two or more of LTE, UMTS, GSM, Bluetooth, WiFi, etc. RAT1 and RAT2 may each be configured to operate in accordance with master RAT and slave RAT roles, e.g. in accordance with a given RAT in a primary role (master RAT) while any remaining RATs assume a secondary role (slave RAT).

Baseband system 206 may be composed of one or more baseband modems, which may correspond to one or both of RAT1 and RAT2. For example, RAT system RAT1 may be implemented as a single baseband modem while RAT system RAT2 may be implemented as a separate baseband modem. Alternatively, RAT systems RAT1 and RAT2 may be implemented as a single unified baseband modem, e.g. a baseband modem configured to two separate network connections for SIM1 and SIM2 in accordance with a multi-SIM design (e.g. DSDS, DR-DSDS, DSDA, etc.).

RAT1 and RAT2 may be configured to exchange data over at least one interface, which may be unidirectional or bi-directional. The interface may be a data bus, shared memory, or another interface allowing exchange of data. As will be detailed, RAT1 and RAT2 may be configured to exchange information regarding downlink data blocks in order to coordinate scheduling.

Application processor 208 may be implemented as a Central Processing Unit (CPU). Application processor 208 may be configured to execute various applications and/or programs of mobile terminal 200, such as e.g. applications corresponding to program code stored in a memory component of mobile terminal 200 (not explicitly shown in FIG. 2). Application processor 208 may also be configured to control one or more further components of mobile terminal 200, such as user input/output devices (display(s), keypad(s), touchscreen(s), speaker(s), external button(s), camera(s), microphone(s), etc.), peripheral devices, memory, power supply, external device interfaces, etc.

Although baseband system 206 and application processor 208 are depicted separately in FIG. 2, it is appreciated that this illustration is not limiting in nature. Accordingly, it is understood that baseband system 206 and application processor 208 may be implemented separately, implemented together (i.e. as an integrated unit), or partially implemented together.

Mobile terminal 200 may be structurally configured according to a multi-SIM design, such as DSDS, DR-DSDS, DSDA, etc. While the following exemplary descriptions may specifically refer to a specific multi-SIM design, it is appreciated that such is not considered limiting in nature.

Therefore, according to an aspect of the disclosure a mobile communication device 200 including a radio frequency (RF) transceiver 204 is disclosed. The RF transceiver is configured to transmit first wireless transmission 104 according to first radio access technology RAT1 and second wireless transmission 106 according to a second radio access technology RAT2.

As shown in FIG. 4, each of first wireless transmission 104 and second wireless transmission 106 follows a transmission schedule. For many types of transmissions, including SR/RACH transmissions from mobile communication device 200 to base stations 110 and 120, transmission opportunities are first scheduled by the base station (e.g. by a network, via the base station), and communicated via scheduling information 105, 107 received by mobile communication device 200 from base stations 110 and 120, respectively. The scheduling information may include both a time for transmission, and a transmission power. Alternately, the scheduling information may include one of a time and/or a transmission power, whereas the UE may set the power level internally. For purposes of this disclosure, the term "transmission schedule" is intended to encompass both a scheduled time and a 'scheduled' transmission power for each so-scheduled transmission.

Figure 4B:
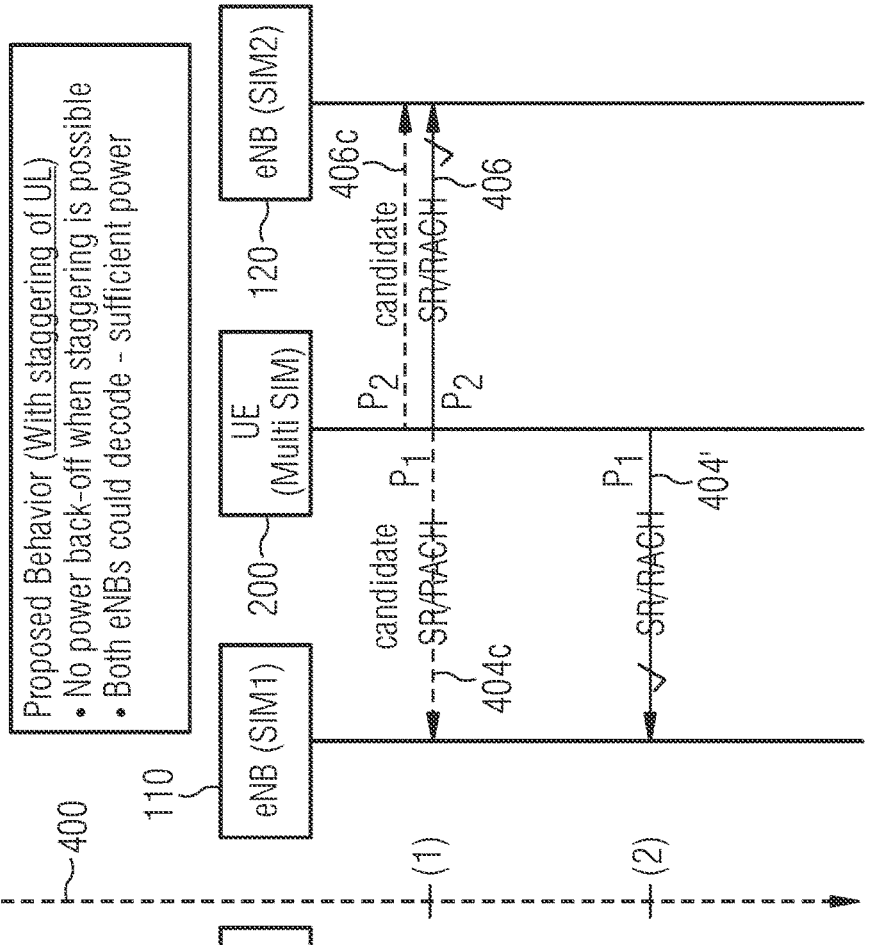
FIGS. 4A-B show transmission behavior in a multi-SIM device.
Figure 4A:
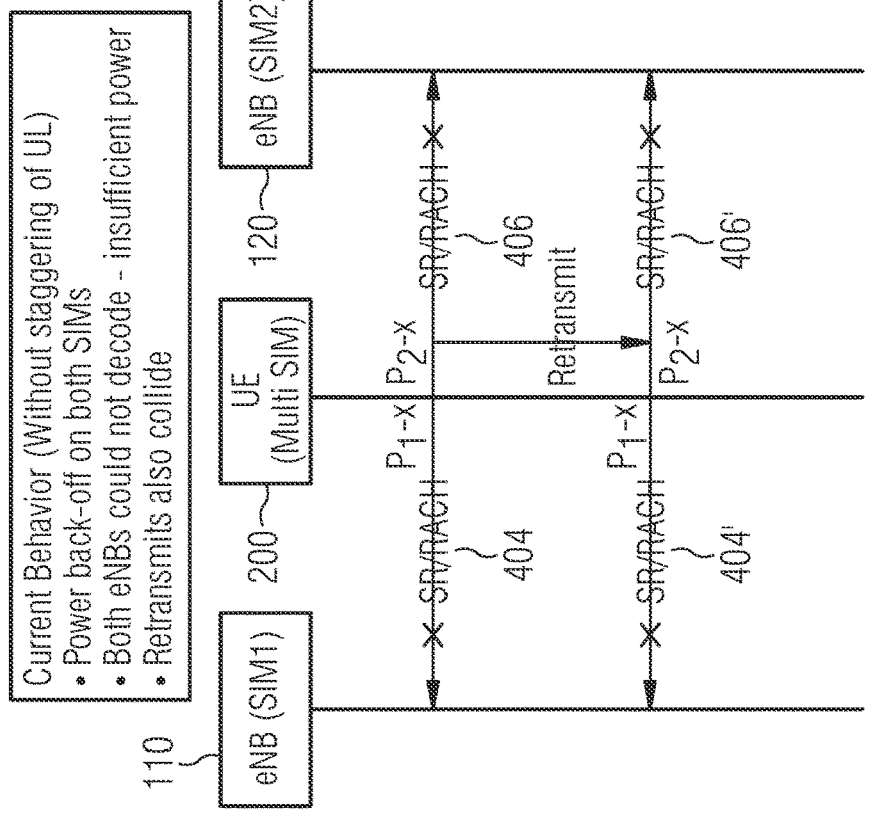

FIG. 4 illustrates transmission scenarios over time in the direction of axis 400. FIG. 4A illustrates simultaneously scheduled uplink (UL) transmissions on both of SIM1 and SIM2 from mobile communication device 200 to each of base stations 110 and 120, respectively. In this illustration, the transmissions are SR/RACH transmissions, although any scheduled transmission from device 200 to base stations 110/120 are to be considered. More particularly, SR/RACH transmissions 404 and 406 are scheduled to be transmitted at time (1), i.e. simultaneously, which is to say that the transmissions overlap in time.

In the scenario illustrated in FIG. 4A, a 'collision' exists between first transmission 404 and second transmission 406. More particularly, the transmissions in this example are scheduled to be transmitted at respective transmission power levels $P_1$ and $P_2$ that would result in a power excursion when transmitted simultaneously. Upon transmission of both first transmission 404 and second transmission 406 at the same scheduled time (1), a power back-off (−X) from the scheduled power is executed on both SIM1 transmission 404 and SIM2 transmission 406, for example to avoid the expected power excursion, that is to avoid the combined transmission power of transmission 404 and 406 from exceeding a predetermined maximum transmission power. More particularly, the power of each transmission is backed off by (−X) such that transmission 404 has a transmission power of $P_1$-X and transmission 406 has a transmission power of $P_2$-X.

The result in the illustrated case is a failure (indicated by a cross-out) of each of transmissions 404 and 406 to properly decode at their respective base stations 110 and 120. Where this occurs, retransmission of first transmission of 404 as 404' and parallel retransmission of second transmission 406 as 406' may be scheduled for time (2), with the result that the signals 404' and 406' may collide and fail again, in the manner observed with the transmission of 404 and 406.

In order to address this scenario, an aspect of the disclosure contemplates a processor, such as application processor 208 (digital processing circuits 302a or 304a within baseband unit 206 may carry out processing, in addition to or instead of application processor 208). The processor determines a maximum transmission power limit for the mobile communication device, which may be stored in memory 302, or may be a hardware design limitation, such as a maximum output of RF transceiver 204, or may be a value set by software, or received from a base station.

Processor 208 may then identify a candidate first schedule, (404c, FIG. 4B) that corresponds to a time during which transmission 404 is scheduled to be performed. As illustrated in FIG. 4B, candidate first schedule 404c is shown as a dashed line indicating a scheduled transmission from mobile communication device (UE) 200 to base station (eNB) 110 via SIM1 during time (1). Likewise, a candidate second schedule 406c is identified by processor 208. As illustrated in FIG. 4B, candidate second schedule 406c is shown as a dashed line indicating a scheduled transmission from mobile communication device 200, also during time (1), but in this case to base station 102 via SIM2. Accordingly, as shown, both first transmission 404 and second transmission 406 are scheduled to occur simultaneously in FIG. 4B in the manner that first transmission 404 and second transmission 406 are shown actually being transmitted simultaneously in FIG. 4A.

However, rather that transmit two signals simultaneously, processor 208 may calculate an aggregate transmission power requirement for transmission of the first wireless transmission and the second wireless transmission according to the identified candidate schedules. Calculation of the aggregate transmission power can be accomplished by determining what the total output power of the RF transceiver would be if, unlike in FIG. 4A, the first transmission and the second transmission took place as scheduled (that is, at the scheduled time and scheduled power). Where the aggregate transmission power requirement exceeds the maximum transmission power limit, a power excursion collision exists. In other words, the calculation of the aggregate transmission power and comparison to the determined maximum transmission power limit may operate together to determine whether a 'power collision' exists that may result in uniform throttling back of transmission power in order to avoid a 'power excursion' as shown in FIG. 4A.

Where a power collision is detected, a power excursion can be avoided in accordance with an aspect of the disclosure by asymmetrical apportionment of transmission scheduling of the first wireless relative to the second wireless transmission. For purposes of this disclosure, "asymmetric apportionment" in the context of transmission scheduling is understood to mean an uneven distribution or allocation of the combined resources of time and power scheduled for the first transmission and the second transmission. By way of example, shifting the timing of one transmission from its scheduled time by a different amount than another is an example of asymmetric apportionment, in this case of time. Likewise, reducing (or increasing) the transmission power of one signal by a different amount relative to another signal is also asymmetrical apportionment, in this case of power. Asymmetrical apportionment is also considered to have taken place where only one of two transmissions is rescheduled as to either time or power while the other transmission is transmitted as scheduled as to time and/or power.

Asymmetrical apportionment is illustrated in FIG. 4B, especially with respect to asymmetrical apportionment of time. In particular, candidate first transmission 404c and candidate second transmission 406c are shown to be scheduled for simultaneous transmission, in particular at time (1). As discussed above, the simultaneous transmission of a first transmission, such as 404 according to 404c and a second transmission such as 406 according to 406c may result in the combined respective output of power $P_1$ and $P_2$ exceeding a maximum power limit. Refraining from transmission of one of transmissions 404 or 406 while transmitting the other as scheduled is an example of an asymmetrical apportionment. For example, 406 is transmitted, as scheduled, at time (1) and at a power $P_2$, while 404 is not transmitted at all. Instead, 404 has been reallocated, i.e. reapportioned, as 404', which transmits the SR/RACH at a different time (2) but at full power $P_1$, which would have resulted in a power excursion if transmitted at the earlier time (1).

The asymmetrical allocation of actual transmissions based on originally scheduled 404c and 406c results in both actual transmissions being decoded properly (indicated by check mark) at respective base station 120 for transmission 406 and base station 110 for reallocated transmission 404'. This kind of asymmetrical apportionment or allocation of transmission scheduling is based on asymmetrical time-shifting of multiple transmissions, as may occur in a multi-SIM device, and is also referred to herein as "staggering" of transmissions, as described in greater detail below. However, alternate forms of asymmetrical allocation or apportionment may also be contemplated, and are explicitly within the scope of the instant disclosure. For example, asymmetrical power reduction or 'back-off' of transmission power is also discussed in greater detail below. Moreover, omission entirely of one scheduled transmission may be considered asymmetrical apportionment of scheduled transmissions, where for example at least one colliding transmission is not so omitted.

As set forth herein, moreover, the mobile communication device advantageously avoids exceeding its designated maximum power limit as a result of the asymmetric apportionment. This may be the case even where RAT1 is a different radio access technology to RAT2 or where first wireless transmission 104 comprises a transmission to a first base station or eNodeB 110 or where candidate first schedule is provided to the mobile communication device 200 by base station or eNodeB 110 and where second wireless transmission 106 is to a second base station or eNodeB 120, for example as shown in FIG. 1. However, the instant disclosure is equally applicable to situations where both first transmission 104 and second transmission 106 are to the same base station.

The maximum power limit is related to RF output, and may be an instantaneous power limit, or may be a limit measured as an average over a period of time. The maximum power limit may be measured as a specific absorption rate and may be measured in watts/kilogram (W/kg) of living tissue. Importantly, the maximum power limit may be designated as a limit for a single mobile communication device. In other words, a dual-SIM phone may have the same maximum power limit as a single-SIM phone.

I. Staggering Uplink Transmissions

The example of asymmetric apportionment shown in FIG. 4 and the accompanying description illustrates the reallocation by time-shifting that is a basis for the presently disclosed 'staggering' of uplink (UL) transmissions, i.e. transmissions from mobile communications device (UE) 200 to a base station. The uneven application of the shift between transmissions is in part what lends asymmetry to the process, although the staggering is the objective. Staggering in this manner is achieved by determining whether an overlap exists in time between respective wireless transmissions according to candidate first schedule 404c and candidate second schedule 406c. The term 'overlap' is intended to include not only simultaneously scheduled transmissions, but any transmissions scheduled sufficiently closely in time as to have a measurable additive effect on the total power output of UE 200. An overlap may also be defined by reference to a specific time period, such as the time required for a subframe, plus or minus one, or more. According to certain RATs, a subframe may have a duration of 1 ms. Other RATs may operate according to subframes of a different duration, and the applicable time period for identification of an overlap may be adjusted to match.

When an overlap is detected, one of the candidate schedules is selected for reapportionment, meaning that one of candidate schedule 404c or 406c is chosen for asymmetric apportionment. In the case of staggering of UL transmissions, the reapportionment of one transmission, is reflected in a deviation from the scheduled time of the selected candidate schedule associated with that transmission. Accordingly, by application of the shift or deviation, the UE refrains from transmitting one of the first wireless transmission and the second wireless transmission according to the selected candidate schedule.

The refrained-from transmission may be transmitted at a later time, where the shift reduces or eliminates the overlap that would otherwise lead to a power collision/power excursion. This is illustrated generally in FIG. 4B, where transmission 404 is refrained in favor of transmission 404', which takes place at time (2), after having been shifted from its originally scheduled time (1). Thus, the asymmetrical apportioning is effected by applying a shift to the scheduled transmission time (i.e. time (1)) of the selected candidate schedule (in this case 404c) to generate a time-shifted schedule (404' as shown in FIG. 4B).

The magnitude of the shift in time can be any duration, provided it is sufficient to reduce or eliminate the detected overlap. The shift may be selected by the UE and the shift may also be by a predetermined amount, for example it may be set according to the duration of a number of subframes, or by another means. The shift may also be a shift by a predetermined time.

In certain scenarios, such as when the UL traffic is not very high, the UE can stagger the UE initiated UL transmissions to avoid simultaneous (or overlapping) transmissions in both the SIMs, especially in random access (RACH), scheduling requests (SR) and semi-persistent scheduling (SPS) of UL grants, such as in LTE. FIG. 5 illustrates the staggering of simultaneous or overlapping SR/RACH requests in a dual SIM configuration. In such cases, the selected candidate schedule for shifting according to the disclosed asymmetric apportionment is a schedule for a RACH transmission.

More particularly, FIG. 5 shows the proposed behavior of UE 200 when simultaneous SR or RACH is triggered on the two SIMs. As the cells are not synchronized, simultaneous may be considered where the transmissions overlap by plus or minus 1 subframe. SR request 512 from protocol stack (PS) layer SIM1 and SR request 514 from PS SIM2 originate simultaneously. In the PHY layer, based on the priority of the requests, one of the SRs/RACH is deferred to the next non-overlapping opportunity.

As shown in FIG. 5, the shift is two subframes, and the first wireless transmission is approximately equally staggered relative to the second wireless transmission. Moreover, a scheduling of at least one future SR/RACH transmission is impacted by said shift, such that at least one future overlap in SR/RACH transmissions from SIM1 and SIM2, respectively, is avoided.

Figure 6:
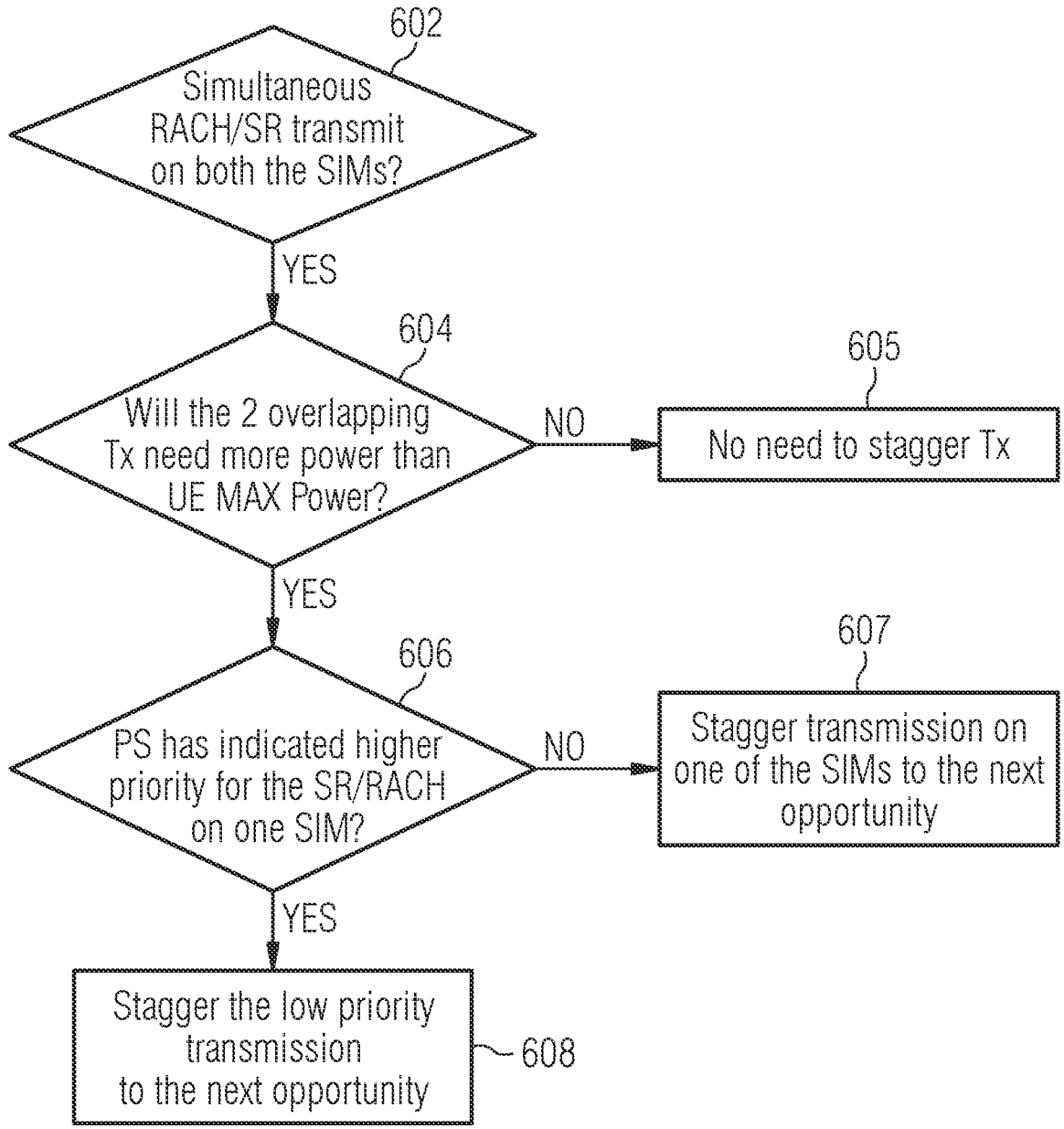
FIG. 6 is a flowchart illustrating decision criteria for staggered transmission according to an aspect of the disclosure.

The selection of one of the first or second transmission as the selected transmission for a scheduling shift for purposes of implementing a staggering of otherwise simultaneous transmissions may be chosen according to any formula, including at random. However, it may be advantageous to select the transmission that is to be shifted based on priority, particularly such that the lower priority transmission be shifted, in favor of the higher priority transmission, which may be transmitted according to its original schedule. FIG. 6 is a flowchart illustrating such a procedure.

More particularly, at 602, the presence of simultaneous SR/RACH transmissions is detected. If found, a determination is made at 604 as to whether a power collision/power excursion is expected as a result of the determination of 602. Where no such excursion is expected (605) there is no need to stagger the transmissions. They may both proceed as scheduled. Where they do collide, an attempt may be made to determine whether one of the transmissions has higher priority. Where no priority can be established (607) it does not matter which of the two transmissions is shifted in order to obtain the staggered arrangement. However, where priority can be established (608), it may be advantageous to shift the transmission having lower priority.

Protocol stack may assign different priorities based on criticality of the transmission, for example to start a voice call, to start a data session, to send a control layer message, etc. The typical UL allocations from the eNodeB may occur after approximately a fixed time interval after the UE transmits SR/RACH. In case of SR, the allocation delays may be fixed. So when SR/RACH for both the SIMs get triggered simultaneously (within fully or partially overlapping subframes) the staggering of the requests increase the likelihood that subsequent UL grants will not overlap.

Asymmetric apportionment according to the technique of staggering may be advantageous when two SIMs are connected to the same eNodeB, as reselections can be triggered together for both SIMs, which may result in tracking area update (TAU) and hence simultaneous RACH. The probability is high when both SIMs are on the same operator and connected to the same eNodeB. Similarly, simultaneous SR/RACH for sending measurement reports on two SIMs as triggers might me met at the same time. This probability is high when both SIMs are on the same operator and connected to the same eNodeB. Also similarly, just after power-on, when the UE tries to do net attach on both SIMs.

According to a further aspect of the disclosure, asymmetrical apportionment by staggering may also be advantageously applied to prevent or reduce the likelihood of power collisions/power excursions due to transmissions pursuant to semi-persistent scheduling (SPS) grants. More particularly, in multi-SIM mobile communication device/UE 200, wherein first wireless transmission 104 and second wireless transmission 106 are each scheduled according to the activation of respective first and second SPS grants, successful shifting of the scheduling of one of the signals may avoid a power collision between transmissions 104 and 106, as well as subsequent transmissions scheduled according to the SPS scenario.

Figure 7:
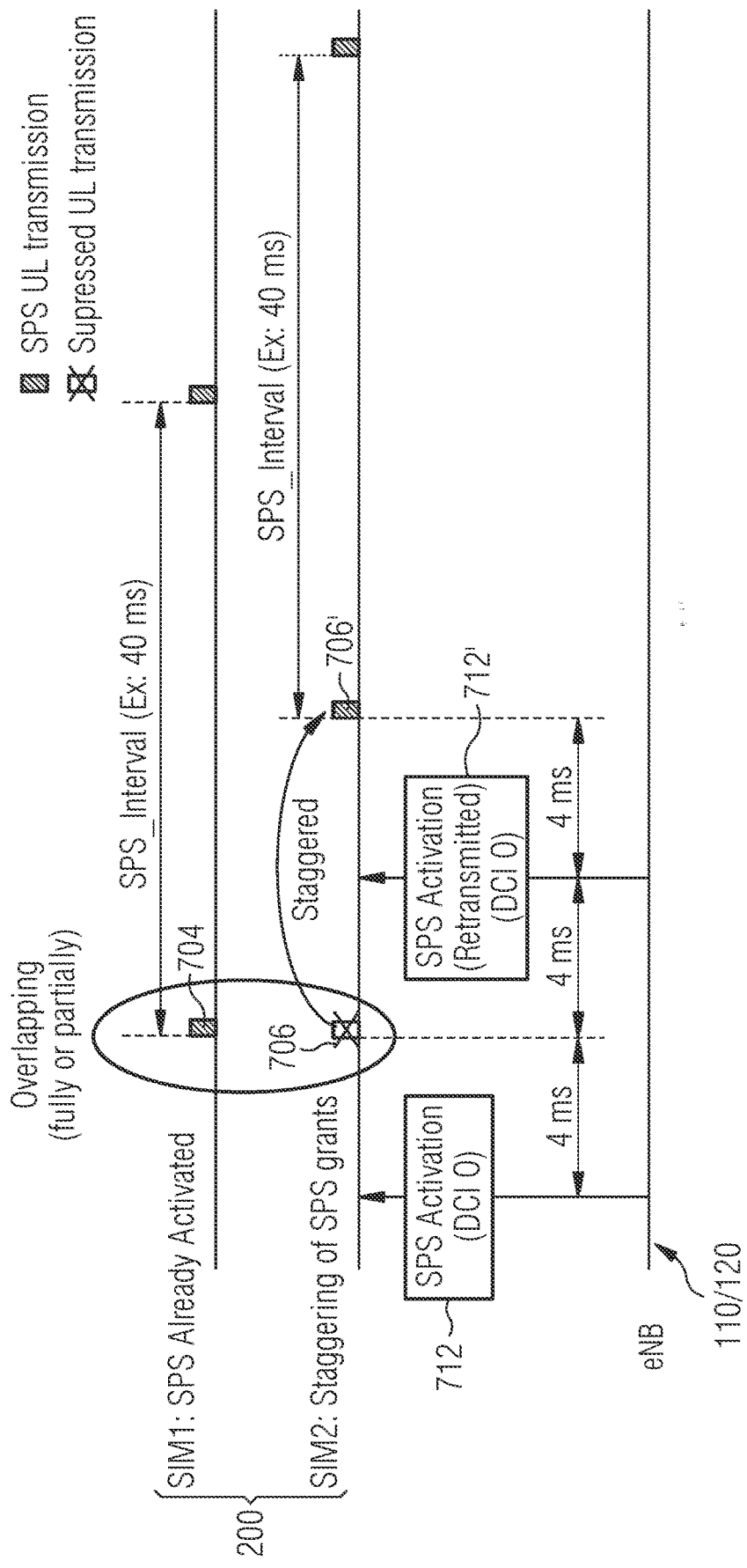
FIG. 7 shows a staggering of SPS transmissions according to an aspect of the disclosure.

FIG. 7 illustrates UE behavior according to an aspect of the disclosure in a scenario where SIM1 has SPS 704 configured and already activated, for example for one real-time traffic such as video streaming, and SPS 706 is there-after activated for SIM2 for a second periodic traffic, such as voice over Internet Protocol (VoIP). Time relevance shown in FIG. 7 may be for frequency division duplexing (FDD). When SPS 706 activation 712 occurs for SIM2, UE 200 may detect that grant 706 corresponding to this activation message (4 ms from the reception of the activation grant) overlaps with the periodic grant in SIM1. The UE may check if this overlap is expected to occur frequently base on SPS_Interval (periodicity of the grants). If there is an overlap, then UE 200 may act so that it refrains from transmitting in an overlapping grant.

It may then be expected to occur, that eNodeB 110 or 120 for SIM2 will detect DTX (no energy transmitted by UE 200) and may be expected to 'conclude' that SPS activation (MAC CE) 712 was not received by UE 200 and will resend the SPS activation message as 712'. This procedure may shift the SPS grant for SIM2 by 8 ms and as the SPS grants are periodic in the example illustrated in FIG. 7, with 40 ms periodicity in both the SIM cards, it may be expected that the shift thus introduced will persistently avoid power excursions/collisions over a period of time, as shown.

According to an aspect of the disclosure, the first SPS grant and the second SPS grant are issued by a common eNodeB, or may be applicable where the first SPS grant and the second SPS grant are issued simultaneously, in contrast to the scenario illustrated in FIG. 7. Moreover, the SPS interval is set by the eNodeB.

As in the staggering approach described in connection with SR/RACH, above, and illustrated in detail in FIG. 6, processor 208 (FIG. 2) determines whether candidate first schedule (corresponding, for example to SPS transmission 704) or candidate second schedule (corresponding, for example to omitted SPS transmission 706) is associated with a wireless transmission having a higher priority than the other based on a predetermined criterion, and selecting the candidate for shifting based on the priority.

In the most basic sense, a currently active SPS session may advantageously be given "priority" over a newly activated session. This assumption is in operation in the illustration of FIG. 7. However, in general, where priority can be established, the SPS transmissions that have lower priority are preferentially 'selected' for shifting for purposes of staggering the transmissions.

If UL SPS grants overlap on two SIMs, and if the periodicity (SPS interval) is the same or an integer multiple of one another, all subsequent grants will overlap and see a performance degradation where the UL is transmit power limited by the UE. By avoiding overlap by ignoring the overlapping grant and allowing the eNodeB to activate at a later time, there can be a performance benefit, such as by effective increase in UL link budget, and there can be a power consumption benefit by decreasing the number of retransmissions necessary to deliver the same amount of data in uplink.

II. Selective Power Back-Off

Whereas the staggering approach discussed above is centered on asymmetrical apportionment of scheduled time between transmission 104 and transmission 106. As noted above, however, power excursions can be prevented by asymmetrically reapportioning power $P_1$ relative to power $P_2$. In particular where overlap of UL transmissions on two SIMs cannot be avoided, such as when UL data traffic is high, transmit power limited scenarios may benefit from asymmetrical (rather than uniform) back off on transmit power of the SIMs. Transmit power can be backed off (lowered) from the calculated value based on relative priority of the overlapping UL transmission.

In accordance with an aspect of the disclosure, asymmetric apportioning may include transmitting a selected transmission at a power different from its respective scheduled power, in particular a reduced power. In this implementation, as in the staggering examples, processor 208 may determine whether one of first wireless transmission 104 or second wireless transmission 106 a higher priority based, for example on a predetermined criterion and selecting of a candidate schedule for power back-off based on the determined priority. In particular, the selected candidate schedule is advantageously the schedule determined to have the lower priority. More particular, the processor may advantageously calculate the reduced power such that the aggregate transmission power is approximately equal to the maximum power limit, but in any case not above the limit.

Figures 8, 9:
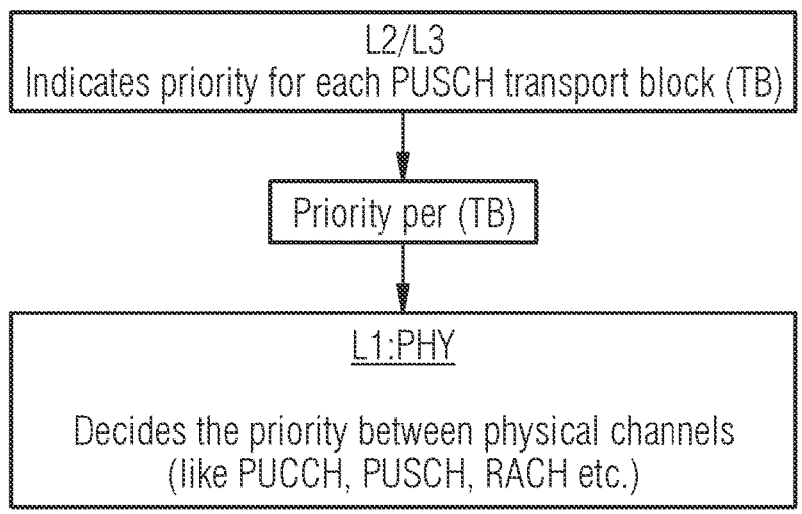
FIG. 8 is a diagram illustrating priority according to an aspect of the disclosure.
FIG. 9 is a priority table according to an aspect of the disclosure.

For selectively or asymmetrically backing off transmit power, the functionality split between different layers and the priority table is illustrated in FIGS. 8 and 9. In particular, FIG. 8 illustrates a functionality split. For the physical layer channels, the priority is decided by L1. For uplink data, the relative priority of different transport blocks is decided by higher layers L2/L3.

FIG. 9 shows the relative priorities between different physical layer channels and priority between transport blocks carrying different type of L2/L3 data. Note that for staggering of RACH/SR, L2 may optionally indicate to L1 the purpose of RACH/SR so that L1 can determine which request to delay in case of overlap.

FIG. 10 describes decision criteria to selectively, i.e. asymmetrically, back off power based on priority or drop UL transmissions for lower priority transmissions. More particularly, a determination of whether a difference in priority exists is made in 1012. If no priority is detected, priority may be assigned randomly, or, as shown in 1013, a uniform back-off may be implemented for both transmissions.

Where a priority does exist, or is assigned, the higher priority transmission may be sent at a calculated transmission (Tx) power (1014). The lower priority transmission is addressed in 1016. In particular, if the lower priority transmission is backed off by more than a threshold TH, the lower priority signal may be dropped entirely (e.g., transmitted at zero power) 1019, or may be transmitted at reduced power if not below threshold TH (1018).

Accordingly, apportioning, according to an aspect of the disclosure includes reducing the power of the transmission to zero, optionally, or where appropriate. The transmission scheduled according to the lower priority schedule is not provided to the RF transceiver according to an aspect of the disclosure for transmission where the reduced power is reduced from the respective scheduled power by more than a predetermined amount. Moreover, refraining from transmitting according to the selected schedule where the reduced power is below a predetermined threshold, is also contemplated.

When transmit power on one of the SIMs is backed off by more than a threshold, such as 3 dB, the transmission can advantageously be dropped. No transmitting at a very low power has the following advantages, 1) no unnecessary interference to the system and 2) UE battery power is not wasted in doing a transmission that is unlikely to be properly decoded.

While the above description may focus on certain radio access technologies and radio connectivity states, it is appreciated that the detailed aspects of this disclosure are considered demonstrative in nature, and accordingly may be applied to other mobile devices that support multiple radio connections with the same or different radio access technologies, numbers of SIMs, and/or radio connectivity states. Furthermore, the implementations detailed herein may apply to conflicts for any type of radio activity for multiple radio connections, and thus may not be limited to the specific aspects described here by example.

It is appreciated that the terms "user equipment", "UE", "mobile terminal", mobile device, etc., may apply to any wireless communication device, including cellular phones, tablets, laptops, personal computers, and any number of additional electronic devices.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following Examples pertain to further aspects of this disclosure:

Example 1 is a method for apportioning uplink transmission power in a mobile communication device, the method comprising:

determining a maximum power limit for the mobile communication device;

identifying a first wireless transmission scheduled to transmit at a first power and a first time according to a first radio access technology (RAT1);

identifying a second wireless transmission scheduled to transmit at a second power and a second time according to a second radio access technology (RAT2);

calculating an aggregate transmission power required for transmission of the first wireless transmission and the second wireless transmission as respectively scheduled;

determining if the aggregate transmission power exceeds the maximum power limit;

apportioning transmission asymmetrically as to at least one of power and/or time between the first wireless transmission and the second wireless transmission depending upon the determination if the aggregate transmission power exceeds the maximum power limit; and transmitting at least one of said first and/or second wireless transmission based on the asymmetrical apportionment.

In Example 2, the method of Example 1 may optionally be, wherein said calculating is performed by summing the first power and the second power over time.

In Example 3 the method of Example 1-2, may optionally further include transmitting the first and second wireless transmission according to said asymmetrical apportionment.

In Example 4 the method of Example 1-3, may optionally be wherein the transmitting the first and/or second wireless transmission does not exceed the maximum power limit.

In Example 5 the method of Example 1-4, may optionally be wherein the mobile communication device is a dual subscriber identity module (dual-SIM) device wherein the first wireless transmission corresponds to a first SIM and the second wireless transmission corresponds to a second SIM installed in the mobile communication device.

In Example 6 the method of Example 1-5, is optionally wherein RAT1 is a different radio access technology to RAT2.

In Example 7 the method of Examples 1-6, is optionally wherein the first wireless transmission comprises a transmission to a first eNodeB.

In Example 8 the method of Example 7, is optionally wherein the second wireless transmission comprises a wireless connection to a second eNodeB different from the first eNodeB.

In Example 9 the method of Example 1-8, is optionally wherein the maximum power limit is an instantaneous power limit.

In Example 10 the method of Example 1-9, is optionally wherein the maximum power limit is a specific absorption rate.

In Example 11 the method of Example 10, is optionally wherein the specific absorption rate is measured in watts/kilogram (W/kg) of living tissue.

In Example 12 the method of Example 7-9, is optionally wherein the maximum power limit is designated as a limit for a single mobile communication device.

In Example 13 the method of Example 1-12, is optionally wherein said apportioning further comprises:

determining whether an overlap exists between the scheduled time of first wireless transmission and the scheduled time of the second wireless transmission;

selecting one of the first wireless transmission or the second wireless transmission;

and refraining from transmitting the selected wireless transmission as scheduled.

In Example 14 the method of Example 13, is optionally wherein the overlap is within plus or minus one subframe as defined under at least one of RAT1 or RAT2.

In Example 15 the method of Example 13-14, is optionally wherein the first wireless transmission and the second wireless transmission are scheduled to occur simultaneously.

In Example 16 the method of Example 13-15, is optionally wherein said apportioning further comprises shifting the transmission of the selected transmission to a shifted time different from its respective scheduled time.

In Example 17 the method of Example 16, is optionally wherein said shift delays or advances the scheduled time of the selected transmission by a predetermined amount of time.

In Example 18 the method of Example 16-17, is optionally wherein the selected transmission is a random access channel (RACH) transmission.

In Example 19 the method of Example 18, is optionally wherein the shift of the selected transmission delays or advances the selected transmission by two subframes.

In Example 20 the method of Example 19, is optionally wherein the shift is triggered by the mobile communication device.

In Example 21 the method of Example 18-20, is optionally wherein the first wireless transmission is approximately equally staggered relative to the second wireless transmission.

In Example 22 the method of Example 21, is optionally wherein a scheduling of future RACH transmissions is impacted by said shift, such that at least one future overlap in RACH transmissions from the first SIM and the second SIM, respectively, is avoided.

In Example 23 the method of Example 13-22, optionally further including:

determining whether one of said first wireless transmission or said second wireless transmission has a higher priority based on a predetermined criterion;

wherein said selecting is based on the priority.

In Example 24 the method of Example 23, is optionally wherein the one of the first or second wireless transmission with lower priority is the selected wireless transmission.

In Example 25 the method of Example 16-17, is optionally wherein the selected transmission is a scheduling request (SR).

In Example 26 the method of Example 18, is optionally wherein the shift of the selected transmission delays or advances the selected transmission by two subframes.

In Example 27 the method of Example 19, is optionally wherein the shift is triggered by the mobile communication device.

In Example 28 the method of Example 18-20, is optionally wherein the first wireless transmission is approximately equally staggered relative to the second wireless transmission.

In Example 29 the method of Example 21, is optionally wherein a scheduling of future SR transmissions is impacted by said shift, such that at least one future overlap in SR transmissions from the first SIM and the second SIM, respectively, is avoided.

In Example 30 the method of Example 13-22, may further include:
determining whether one of said first wireless transmission or said second wireless transmission has a higher priority based on a predetermined criterion;
wherein said selecting is based on the priority.

In Example 31 the method of Example 30, is optionally wherein the one of the first or second wireless transmission with lower priority is the selected wireless transmission.

In Example 32 the method of Example 13-17, is optionally wherein at least one of the first and/or second wireless transmission is scheduled according to a semi persistent scheduling (SPS) grant.

In Example 33 the method of Example 32, is optionally wherein the first wireless transmission and the second wireless transmission are each scheduled according to the activation of respective first and second semi persistent scheduling (SPS) grants.

In Example 34 the method of Example 33, is optionally wherein the first SPS grant and the second SPS grant are issued by a common eNodeB.

In Example 35 the method of Example 33-34, is optionally wherein the first SPS grant and the second SPS grant are issued simultaneously.

In Example 36 the method of Example 33-35, is optionally wherein the data transmitted according to the first SPS grant is of a first type and the data transmitted according to the second SPS grant is of a second type.

In Example 37 the method of Example 33-36, further comprising checking whether the overlap of the grants is periodic.

In Example 38 the method of Example 33-37, is optionally wherein said refraining from transmitting the selected transmission triggers the activation of a third SPS grant for the selected wireless transmission.

In Example 39 the method of Example 38, is optionally wherein the selected wireless transmission is shifted according to the third SPS grant.

In Example 40 the method of Example 39, is optionally wherein transmission remains staggered during an SPS interval.

In Example 41 the method of Example 40, is optionally wherein the SPS interval is set by an eNodeB.

In Example 42 the method of Example 33-41, optionally further including:
determining whether one of said first wireless transmission or said second wireless transmission has a higher priority based on a predetermined criterion;
wherein said selecting is based on the priority.

In Example 43 the method of Example 42, is optionally wherein the one of the first or second wireless transmission with lower priority is the selected wireless transmission.

In Example 44 the method of Example 13, is optionally wherein said apportioning further comprises transmitting the selected transmission at a power different from its respective scheduled power.

In Example 45 the method of Example 44, is optionally wherein said power different from its respective scheduled power is a reduced power relative to the respective scheduled power.

In Example 46 the method of Example 45, optionally further including:
determining whether one of said first wireless transmission or said second wireless transmission has a higher priority based on a predetermined criterion;
wherein said selecting is based on the priority.

In Example 47 the method of Example 46, is optionally wherein the one of the first or second wireless transmission with lower priority is the selected wireless transmission.

In Example 48 the method of Example 44-47, further comprising calculating the reduced power such that the aggregate transmission power is approximately equal to the maximum power limit.

In Example 49 the method of Example 46-47, is optionally wherein said apportioning further comprises reducing the power of the selected transmission to zero.

In Example 50 the method of Example 45-49, further comprising refraining from transmitting the selected transmission where the reduced power is reduced from the respective scheduled power by more than a predetermined amount.

In Example 51 the method of Example 45-49, further comprising refraining from transmitting the selected transmission where the reduced power is below a predetermined threshold.

In Example 52, a mobile communication device is disclosed including:
a radio frequency (RF) transceiver configured to transmit:
a first wireless transmission according to a first radio access technology (RAT1) and a first schedule, the first schedule including a first transmission time and at a first transmission power; and
a second wireless transmission according to a second radio access technology (RAT2) and a second schedule, including a second transmission time and a second transmission power; and
a processor configured to:
determine a maximum transmission power limit for the mobile communication device;
identify a candidate first schedule and a candidate second schedule;
calculate an aggregate transmission power requirement for transmission of the first wireless transmission and the second wireless transmission according to the identified candidate schedules;
compare the aggregate transmission power requirement to the maximum transmission power limit; and
asymmetrically apportion transmission scheduling of the first wireless transmission and the second wireless transmission in response to the comparison.

In Example 53 the device of Example 52, optionally further includes a baseband system connected to the RF transceiver.

In Example 54 the device of Example 53, is optionally wherein the baseband system is a baseband modem.

In Example 55 the device of Example 53-54, is optionally wherein the baseband system is configured to monitor transmissions from a mobile communications network and determine a transmission strategy in response thereto.

In Example 56 the device of Example 53-55, is optionally wherein the baseband system is connected to the processor.

In Example 57 the device of Example 53-55, is optionally wherein the baseband system is integrated with the processor.

In Example 58 the device of Example 52-57, optionally further includes a first subscriber identity module (SIM) associated with RAT1 and a second SIM associated with RAT2.

In Example 59 the device of Example 58, is optionally wherein the mobile communication device is a dual-SIM device.

In Example 60 the device of Example 59, is optionally wherein the first wireless transmission is made according to a communication protocol associated with the first SIM, and the second wireless transmission is made according to a communication protocol associated with the second SIM.

In Example 61 the device of Example 52-60, is optionally wherein said asymmetric transmission apportionment does not exceed said maximum power limit.

In Example 62 the device of Example 52-61, is optionally wherein RAT1 is a different radio access technology to RAT2.

In Example 63 the device of Example 52-62, is optionally wherein the first wireless transmission comprises a transmission to a first eNodeB.

In Example 64 the device of Example 63, is optionally wherein the candidate first schedule is provided to the mobile communication device by the first eNodeB.

In Example 65 the device of Example 63-64, is optionally wherein the second wireless transmission comprises a transmission to a second eNodeB.

In Example 66 the device of Example 65, is optionally wherein the candidate second schedule is provided to the mobile communication device by the second eNodeB.

In Example 67 the device of Example 65-66, is optionally wherein the second eNodeB is different from the first eNodeB.

In Example 68 the device of Example 52-66, is optionally wherein the maximum power limit is an instantaneous power limit.

In Example 69 the device of Example 52-67, is optionally wherein the maximum power limit is a specific absorption rate.

In Example 70 the device of Example 68, is optionally wherein the specific absorption rate is measured in watts/ kilogram (W/kg) of living tissue.

In Example 71 the device of Example 65-67, is optionally wherein the maximum power limit is designated as a limit for a single mobile communication device.

In Example 72 the device of Example 52-68, is optionally wherein the asymmetric apportionment performed by the processor optionally further including:

determining whether an overlap exists in time between respective wireless transmissions according to the candidate first schedule and the candidate second schedule;

selecting one of the candidate first schedule or the candidate second schedule as a selected candidate schedule; and refraining from transmitting one of the first wireless transmission and the second wireless transmission according to the selected candidate schedule.

In Example 73 the device of Example 72, is optionally wherein the overlap is within plus or minus one subframe.

In Example 74 the device of Example 73, is optionally wherein the duration of the subframe is defined under at least one of RAT1 or RAT2.

In Example 75 the device of Example 72-74, is optionally wherein wireless transmissions according to the candidate first schedule and candidate second schedule are scheduled to occur simultaneously.

In Example 76 the device of Example 72-75, is optionally wherein said apportioning further comprises applying a shift to the scheduled transmission time of the selected candidate schedule to generate a time-shifted schedule.

In Example 77 the device of Example 76, is optionally wherein the shift is by a predetermined time relative to the scheduled transmission time of time of the selected candidate schedule.

In Example 78 the device of Example 76-77, is optionally wherein the processor is configured to transmit one of the first wireless transmission or the second wireless transmission according to the time-shifted schedule.

In Example 79 the device of Example 78, is optionally wherein the processor is configured to transmit the other of the first wireless transmission or the second wireless transmission according to the other of the candidate first or candidate second schedule than the selected candidate schedule.

In Example 80 the device of Example 72-79, is optionally wherein the selected candidate schedule is a schedule for a random access channel (RACH) transmission.

In Example 81 the device of Example 80, is optionally wherein the shift is at least two subframes.

In Example 82 the device of Example 79-81, is optionally wherein the first wireless transmission is approximately equally staggered relative to the second wireless transmission.

In Example 83 the device of Example 82, is optionally wherein a scheduling of at least one future RACH transmission is impacted by said shift, such that at least one future overlap in RACH transmissions from the first SIM and the second SIM, respectively, is avoided.

In Example 84 the device of Example 72-83, is optionally wherein selecting optionally further includes:

determining whether one of said candidate first schedule or candidate second schedule is associated with a wireless transmission of higher priority than the other of said candidate schedules, based on a predetermined criterion; and wherein said selecting is based on the determined priority.

In Example 85 the device of Example 84, is optionally wherein the one of the candidate first or candidate second schedule determined to be associated to a transmission having lower priority is selected as the selected candidate schedule.

In Example 86 the device of Example 72-79 and 81-85, is optionally wherein the selected candidate schedule is a schedule for transmission of a scheduling request (SR).

In Example 87 the device of Example 72-79 and 81-85, is optionally wherein at least one of the candidate first and/or second schedule is associated with a wireless transmission scheduled according to a semi persistent scheduling (SPS) grant.

In Example 88 the device of Example 87, is optionally wherein the first wireless transmission and the second wireless transmission are each scheduled according to the activation of respective first and second semi persistent scheduling (SPS) grants.

In Example 89 the device of Example 88, is optionally wherein the first SPS grant and the second SPS grant are issued by a common eNodeB.

In Example 90 the device of Example 88-89, is optionally wherein the first SPS grant and the second SPS grant are issued simultaneously.

In Example 91 the device of Example 88-90, is optionally wherein the data to be transmitted according to the first SPS grant is of a first type and the data transmitted according to the second SPS grant is of a second type.

In Example 92 the device of Example 88-91, is optionally wherein the processor checks whether the overlap of the grants is periodic.

In Example 93 the device of 88-92, is optionally wherein said refraining from transmitting the selected transmission triggers the activation of a third SPS grant for the selected wireless transmission.

In Example 94 the device of Example 93, is optionally wherein the shift is according to the third SPS grant.

In Example 95 the device of Example 94, is optionally wherein the first wireless transmission and the second wireless transmission remain staggered relative to each other during an SPS interval.

In Example 96 the device of Example 95, is optionally wherein the SPS interval is set by an eNodeB.

In Example 97 the device of Example 88-96, is optionally wherein the processor determines whether one of said candidate first schedule said candidate second schedule is associated with a wireless transmission having a higher priority than the other based on a predetermined criterion, and wherein the selected candidate schedule is selected based on the priority.

In Example 98 the device of Example 97, is optionally wherein the selected candidate schedule is the candidate with a lower relative priority.

In Example 99 the device of Example 72, is optionally wherein said apportioning further comprises transmitting the selected transmission at a power different from its respective scheduled power.

In Example 100 the device of Example 99, is optionally wherein said power different from its respective scheduled power is a reduced power relative to the respective scheduled power.

In Example 101 the device of Example 100, is optionally wherein the processor determines whether one of said first wireless transmission or said second wireless transmission has a higher priority based on a predetermined criterion, and wherein said selecting of a candidate schedule is based on said priority.

In Example 102 the device of Example 101, is optionally wherein the selected candidate schedule has been determined to have the lower priority.

In Example 103 the device of Example 99-102, is optionally wherein the processor calculates the reduced power such that the aggregate transmission power is approximately equal to the maximum power limit.

In Example 104 the device of Example 102-103, is optionally wherein said apportioning further comprises reducing the power of the transmission to zero.

In Example 105 the device of Example 102-103 is optionally wherein the transmission scheduled according to the lower priority schedule is not provided to the RF transceiver for transmission where the reduced power is reduced from the respective scheduled power by more than a predetermined amount.

In Example 106 the device of Example 102-103, further comprising refraining from transmitting according to the selected schedule where the reduced power is below a predetermined threshold.

While the aspects of the disclosure have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for apportioning uplink transmission power in a mobile communication device, the method comprising:
    determining a maximum power limit for the mobile communication device;
    identifying a first wireless transmission scheduled to transmit at a first power and a first time according to a first radio access technology (RAT1);
    identifying a second wireless transmission scheduled to transmit at a second power and a second time according to a second radio access technology (RAT2);
    calculating an aggregate transmission power required for transmission of the first wireless transmission and the second wireless transmission as respectively scheduled;
    determining if the aggregate transmission power is above the maximum power limit;
    apportioning transmission asymmetrically based on power or time between the first wireless transmission and the second wireless transmission when the aggregate transmission power is above the maximum power limit, wherein apportioning asymmetrically comprises foregoing transmission in response to a semi-persistent scheduling activation message for one of the RAT1 or the RAT2, wherein the semi-persistent scheduling activation message is configured to cause the mobile communication device to transmit periodic traffic; and
    transmitting the first or second wireless transmission based on the asymmetrical apportionment.

2. The method of claim 1, further comprising transmitting the second wireless transmission according to the asymmetrical apportionment if the first wireless transmission was transmitted and transmitting the first wireless transmission according to the asymmetrical apportionment if the second wireless transmission was transmitted.

3. The method of claim 2, wherein transmitting the first or second wireless transmission is below the maximum power limit.

4. The method of claim 3, wherein the mobile communication device is a dual subscriber identity module (dual-SIM) device wherein the first wireless transmission corresponds to a first SIM and the second wireless transmission corresponds to a second SIM installed in the mobile communication device.

5. The method of claim 4, wherein the first wireless transmission comprises a transmission to a first base station and the second wireless transmission comprises a transmission to a second base station.

6. The method of claim 5, wherein the second wireless transmission comprises a wireless connection to a second base station different from the first base station.

7. The method of claim 1, wherein the maximum power limit is a specific absorption rate.

8. The method of claim 4, wherein said apportioning further comprises:
    determining whether an overlap exists between the first time and the second time;

selecting the first wireless transmission or the second wireless transmission; and refraining from transmitting the selected wireless transmission as scheduled based upon the determination whether an overlap exists between the first time and the second time.

9. The method of claim 8, wherein the overlap is within plus or minus one subframe.

10. The method of claim 8, wherein the apportioning further comprises shifting the transmission of the selected wireless transmission to a time different from its scheduled time.

11. The method of claim 10, wherein the shifting changes a scheduling of future transmissions to avoid at least one future overlap in transmissions from the first SIM and the second SIM, respectively.

12. The method of claim 11, further comprising:
determining whether the first wireless transmission or the second wireless transmission has a priority based on a predetermined criterion;
wherein the selecting is based on the priority.

13. The method of claim 12, wherein the apportioning further comprises transmitting the selected wireless transmission at a power different from its scheduled power.

14. The method of claim 13, wherein the power different from its scheduled power is a reduced power relative to the respective scheduled power.

15. The method of claim 14, further comprising calculating the reduced power to provide the aggregate transmission power being substantially equal to the maximum power limit.

16. The method of claim 15, further comprising refraining from transmitting the selected transmission to reduce the reduced power from the scheduled power by more than a predetermined amount.

17. A mobile communication device comprising:
a radio frequency (RF) transceiver configured to transmit:
a first wireless transmission according to a first radio access technology (RAT1) and a first schedule; and
a second wireless transmission according to a second radio access technology (RAT2) and a second schedule; and
a processor configured to:
determine a maximum transmission power limit for the mobile communication device;
identify a candidate first schedule including a first transmission time and a first transmission power;
identify a candidate second schedule including a second transmission time and a second transmission power;
calculate an aggregate transmission power requirement for transmission of the first wireless transmission according to the candidate first schedule and the second wireless transmission according to the candidate second schedule;
compare the aggregate transmission power requirement to the maximum transmission power limit; and
asymmetrically apportion transmission scheduling of the first wireless transmission and the second wireless transmission in response to the comparison, wherein asymmetrically apportioning comprises foregoing transmission in response to a semi-persistent scheduling activation message for RAT2, wherein the semi-persistent scheduling activation message is configured to cause the mobile communication device to transmit periodic traffic according to the candidate second schedule.

18. The device of claim 17, further comprising a baseband system connected to the RF transceiver.

19. The device of claim 18, wherein the baseband system is a baseband modem.

20. The device of claim 19, wherein the baseband system is configured to monitor transmissions from a mobile communications network and determine a transmission strategy in response thereto.

\* \* \* \* \*